Patented Apr. 1, 1941

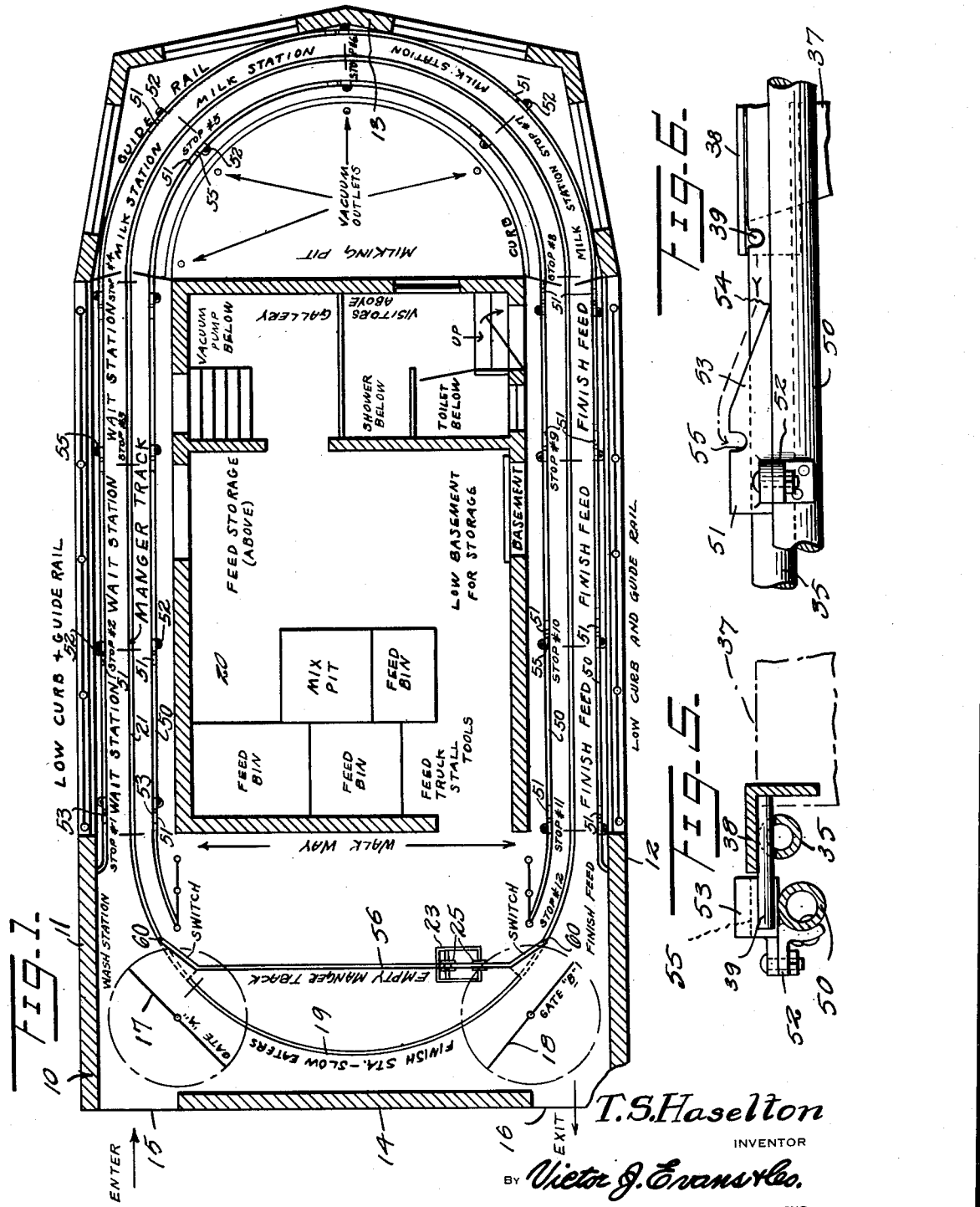

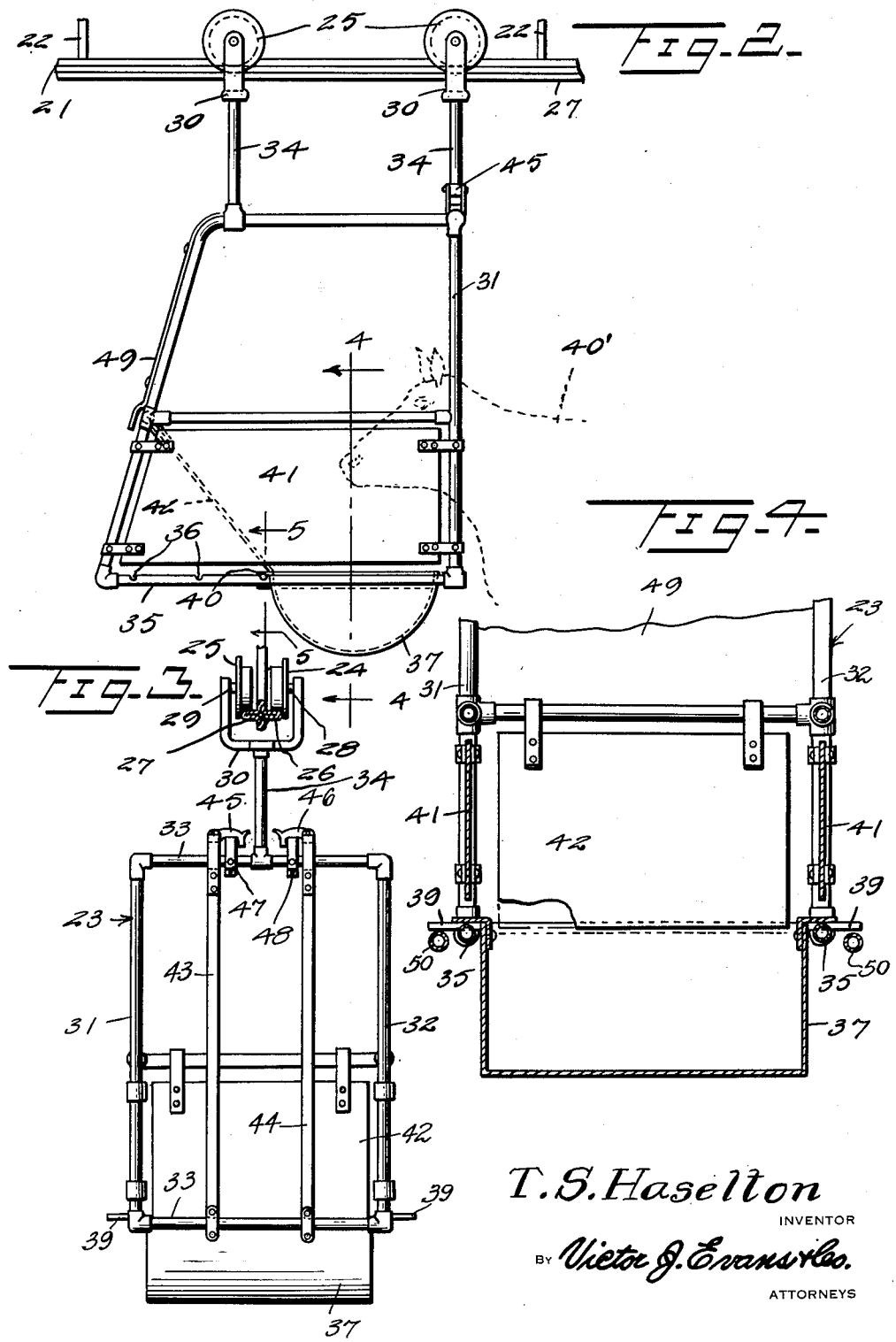

2,236,851

UNITED STATES PATENT OFFICE 2,236,851

MILKING SYSTEM

Thomas S. Haselton, Eustis, Fla.

Application April 20, 1939, Serial No. 269,030

5 Claims. (Cl. 119—16)

My invention relates to buildings and equipment used in milking parlors on dairy farms, or the like.

An important object of my invention is to facilitate the systematic handling of cows through the provision of buildings and equipment in a manner whereby the cows may be moved seriately through the milking operation with a maximum of sanitation and with a minimum of time and labor expended.

Another object of my invention is to provide a circuitous track along which the cows are made to travel and in which the animals may be progressively fed, milked, stripped and released.

Still another object of my invention is to provide a circuitous rail congruently spaced above the track and having movable feed trough supports suspended therefrom to which the cows are releasably secured and which the said cows may propel around the track thereby permitting them to be fed simultaneously with the milking operation.

Yet another object of my invention is to provide a means to automatically stop the animals at each of several stations in order that the necessary administrations at the respective stages may be performed.

A further object of my invention is to provide a circuitous route around which the cows are induced to travel and in association with which the operator may work from the inner circumference thereby facilitating the operations and reducing the manual labor expended to a minimum.

Other objects and advantages of my invention will be apparent during the course of the following description.

In the drawings, forming a part of this specification, and in which like numerals are employed to designate like parts throughout the same—

Figure 1 is a diagrammatic view of a barn or similar building constructed in accordance with the present invention, Figure 2 is a side elevation of a feed trough support embodying a part of my invention, Figure 3 is an end elevation thereof, Figure 4 is a vertical sectional view taken on the line 4—4 of Figure 2, Figure 5 is a vertical sectional view taken on the line 5—5 of Figure 2, and Figure 6 is a fragmentary side elevation of the arrangement as illustrated in Figure 5.

In the accompanying drawings, wherein for the purpose of illustration, is shown a preferred embodiment of my invention, the numeral 10 designates a barn of substantially rectangular formation in plan having sides 11 and 12 and ends 13 and 14. The end 14 is provided with doorways 15 and 16 adjacent the sides 11 and 12 respectively, and pivoted gates 17 and 18 mounted within the barn permit the doorways 15 and 16 to be selectively manually opened and closed. A circuitous track 19 is provided within the barn 10 and defines a route along which groups of cows may be progressively moved by means hereinafter described. A platform 20, the supporting walls of which are shown in section in Figure 1, may be erected within the compass of the track 19 to provide a vantage point from which the general public may view the complete milking operation as a direct educational exhibition or as an adjunct to a restaurant, dairy, or other like business. From their position within the track 19, the public may view the progressive stages through which the cows are moved in successive groups during the milking operation. A platform constructed in a manner suited to the present invention is illustrated diagrammatically in Figure 1. The walls are shown in section to more clearly illustrate the preferred internal arrangement of the platform; however, it is to be understood that the said walls may be provided with a top, which top is elevated from the track 19 and uniquely adapted to the purpose hereinabove set forth.

A rail 21 is suspended from the ceiling of the barn by the hangers 22 congruously with but spaced a substantial distance above the track 19. A plurality of feed trough supports 23 are suspended from and movable along the rail 21 by virtue of the flanged wheels 24 and 25 which ride upon the laterally disposed flanges 26 and 27 of the said rail. The wheels 24 and 25 are rotatably mounted on the stub shafts 28 and 29 which extend inwardly from the arms of the yoke 30, as best illustrated in Figure 3. The supports 23 include substantially trapezoidal shaped side frames 31 and 32 joined at their corners by transverse rods 33. The supports are suspended from the yokes 30 by the rods 34, each being positioned a sufficient distance above the floor of the barn to properly accommodate the head of a cow, in the manner illustrated in Figure 2. The lower rods 35 of the side frames 31 and 32 are formed with horizontally aligning spaced recesses 36, and a feed trough 37 is positioned intermediate of the frames 31 and 32 and with the laterally extending flanges 38 resting upon the rods 35. The feed trough is formed with laterally extending pins 39 adjacent the end 40 thereof which are received within the recesses 36 of the rods 35. As illustrated in Figure 2, the recesses 36 are positioned in the forward end of the rods 35 to permit the feed trough 37 to be accessible or not accessible to the cow 40' at the discretion of the operator.

The plate members 41 are carried by the frames 31 and 32 adjacent the lower end thereof to retain the food within the feed trough and to prevent the cow from pushing the food from the support when eating. The drop plate 42 is pivotally mounted between the frames 31 and 32 and with the free lower end thereof supported by the forward edge of the feed trough to prevent the cow from pushing the food forwardly over the edge thereof. The stanchions 43 and 44 are pivotally mounted on the lower rear rod 33 and the upper ends thereof are provided with dogs 45 and 46 which engage the catches 47 and 48. It may be seen that when the stanchions 43 and 44 are moved laterally toward the outside of the support and that when a cow inserts its head therebetween that the said stanchions may be pivoted upwardly to a vertical position and that when the dogs 45 and 46 engage the catches 47 and 48 the cow will be prevented from withdrawing its head therefrom. A plate 49 closes the forward end of the support to prevent the cow 40' from being distracted by movements in front of its respective support.

Guide rails 50 are positioned laterally at either side of the feed trough support 23 and slightly below the projecting ends of the pins 39. Vertically disposed plates 51 are mounted on the guide rails at selected intervals corresponding to the various stages illustrated in Figure 1. The plates 51 are pivotally mounted to brackets 52 carried by the guide rails and are formed with a sloping rear edge 53 which merges into the outline of the rail as at 54 and the upper edge thereof is provided with a recess 55. The rail 21 is formed at the end 14 of the barn 10 and intermediate of the doorways 15 and 16 with a transversely extending auxiliary rail 56 on which a plurality of the feed trough supports 23 may be kept when not in use.

The arrangement here illustrated is adapted to accommodate groups of four cows which may be moved progressively around the track 19. As the cows are introduced successively through the doorway 15, a feed trough support 23 is moved from the storage rail 56 to the wash station. The feed trough in the support is positioned with the pins 40 resting in the foremost notch 36 in a manner whereby it will not be accessible to the cow, and as the cow inserts its head within the support, the stanchions 43 and 44 may be moved to the vertical position to prevent the cow from drawing its head therefrom. When the projecting ends of the pins 39 are released from the recesses 55 in the plate at the wash station the cow, in attempting to reach the food in the feed trough 37, will walk forwardly in a manner to move the support along the rail 21 until it reaches the last wait station along the side 11 of the barn. At this point the projecting ends of the pins will engage another of the plates 51 and drop into the notch 55. As the pins ride up the sloping edge 53 of the plates they will be removed from the recesses 36 in the rods 35 of the supports. After the pins are positioned with the recesses 55 of the plates, the food trough will slide rearwardly on the rods 35 to the position illustrated in Figure 2 so that the cow 40' may have ready access to the food therein and may be engaged in eating while the rest of the group are being moved into position. Because of the pivotal connection of the plates with the bracket 52, they may be moved outwardly of the guide rails so as not to engage the pins of the first support. After the first support has passed to the last wait station, the next set of plates may be moved to the pin engaging position over the guide rails so that the next cow will be stopped at the second wait station. When the first group of four cows has been washed and three of the cows comprising the group have been advanced to occupy the three wait stations, the fourth cow remaining in the wash station, the feed troughs are moved forwardly in the supports and the plates pivoted to the releasing position, so that each of the cows will once more be induced to move its respective support along the rail in an endeavor to obtain the food. The group is next stopped at the milk stations and each of the cows is halted in its respective place by properly positioning the plates therealong in the same manner described for the wait and wash stations. At this time an additional group of four cows may be introduced through the doorway 15 and made to occupy the vacated wash station and the three wait stations in the manner hereinbefore described. The milking machines may now be brought into operation and after the first group of cows has been milked and stripped it may be moved further along the track to the finish feed station.

It may be seen that as the groups of cows are progressively moved forwardly around the track additional groups may be brought into the barn to occupy the vacated stations of the preceding group, and in a manner whereby a group will occupy various stations in the milking operation at all times, thus greatly expediting the work and reducing the manual labor to a minimum.

At the finish feed stations the cows will be permitted to finish the food within the feed troughs while the succeeding group is being milked, and in the event that they have finished eating when the succeeding group has been milked and stripped, they may be released from their supports and permitted to leave the barn through the doorway 16. If they have not finished eating by the time the group occupying the milk stations are ready to proceed, they may be stationed at the portion of the track 19 adjacent the end 14 of the barn 10 to finish their food. After finishing the remaining food the slow eaters will be released and permitted to leave through the doorway 16, and their feed trough supports may be moved through switch 60 and onto the auxiliary rail 56 in preparation of the next entering group.

It may thus be seen that all stations may be filled simultaneously and that groups of four cows may be moved progressively around the track and that the operators may work from the inner circumference of the walkway thereby greatly reducing the distance that it will be necessary to traverse in performing each of the various operations.

It is to be understood that the form of the invention, herewith shown and described, is to be taken as a preferred example of the same, and that various changes in the size, shape and arrangement of parts may be resorted to without departing from the spirit of my invention, or the scope of the appended claims.

Having thus described my invention, I claim:

1. In dairy equipment, a circuitous rail, a plurality of feed trough supports suspended from and movable on the said rail, a feed trough having projecting parts disposed within each of the supports, means to releasably secure the head of a cow within each of the said feed trough supports, guide rails disposed laterally of the said supports, and spaced stop means carried by the said guide rails and engageable with the projecting parts of the said feed troughs to prevent further movement thereof.

2. In dairy equipment, a circuitous rail, a plurality of feed trough supports suspended from and movable on the said rail, means to releasably secure the head of a cow within each of the said supports, a feed trough adjustably mounted within each of the supports and being beyond the reach of the cow in one position, guide rails disposed laterally of the said supports, and stop means carried by the said guide rails and engageable with the said feed trough to hold the same against further movement, continued actuation of the supports effecting adjustment of the feed troughs within the supports to a position readily accessible to the said cows.

3. In dairy equipment, a circuitous rail, a plurality of frameworks suspended from and movable on the said rail, means to releasably secure the head of a cow within each of the said frameworks, feed troughs slidably carried by the said frameworks and adapted in one position to be beyond the reach of the cow, pins carried by the feed troughs and projecting laterally of the said frameworks, guide rails positioned laterally of the feed troughs and under the said pins, and means carried by the said guide rails and engageable with the said pins to hold the said feed troughs against further movement.

4. In dairy equipment, a circuitous rail, a plurality of frameworks suspended from and movable on the said rail, means to releasably secure the head of a cow within each of the said frameworks, feed troughs slidably carried by the said frameworks and adapted in one position to be beyond the reach of the cow, pins carried by the feed troughs and projecting laterally of the said frameworks, guide rails positioned laterally of the feed troughs and under the said pins, and vertically disposed plate members positioned at spaced intervals along the said guide rails and having notches to receive the said pins.

5. In dairy equipment, a circuitous rail; feed trough supports suspended from and movable on the said rail, each of said supports being adapted to detachably hold the head of an animal; a feed trough adjustably supported by each of the feed trough supports, the said troughs being beyond the reach of the animal in one position and readily accessible thereto in another position; and means engageable with parts of the said feed troughs arranged at spaced intervals below the rail, said means being adapted to hold the feed troughs against further movement, whereby continued actuation of the supports will effect movement of the troughs within the supports from the first to the second-mentioned position and thereafter prevent further movement of the supports along the rail.

THOMAS S. HASELTON.